Dec. 10, 1929.  G. A. CAMPBELL  1,738,522
ELECTROMAGNETIC WAVE SIGNALING SYSTEM
Filed Sept. 30, 1919   8 Sheets—Sheet 1
Fig. 2
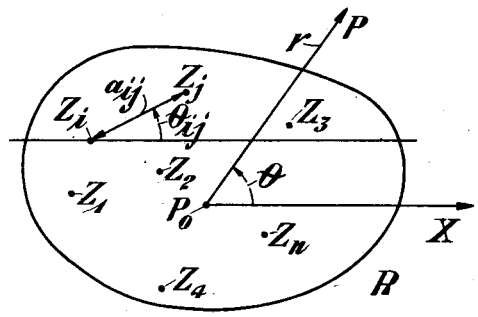
Fig. 1
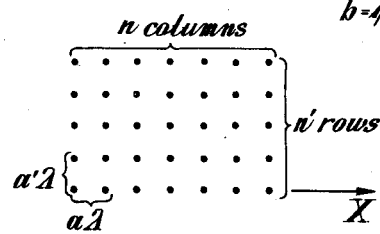
Fig. 4
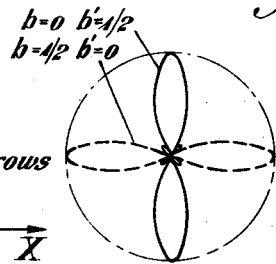
Fig. 5
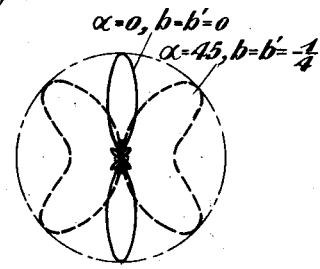
Fig. 5-A
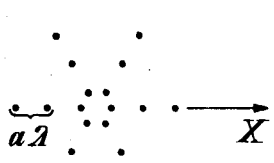
Fig. 6
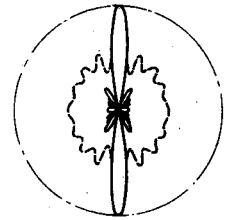
Fig. 7
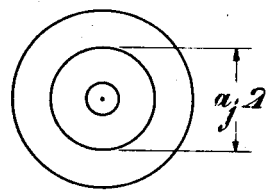
Fig. 8
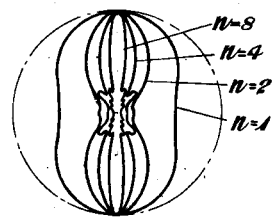
Fig. 9
INVENTOR.
G. A. Campbell
BY
ATTORNEY

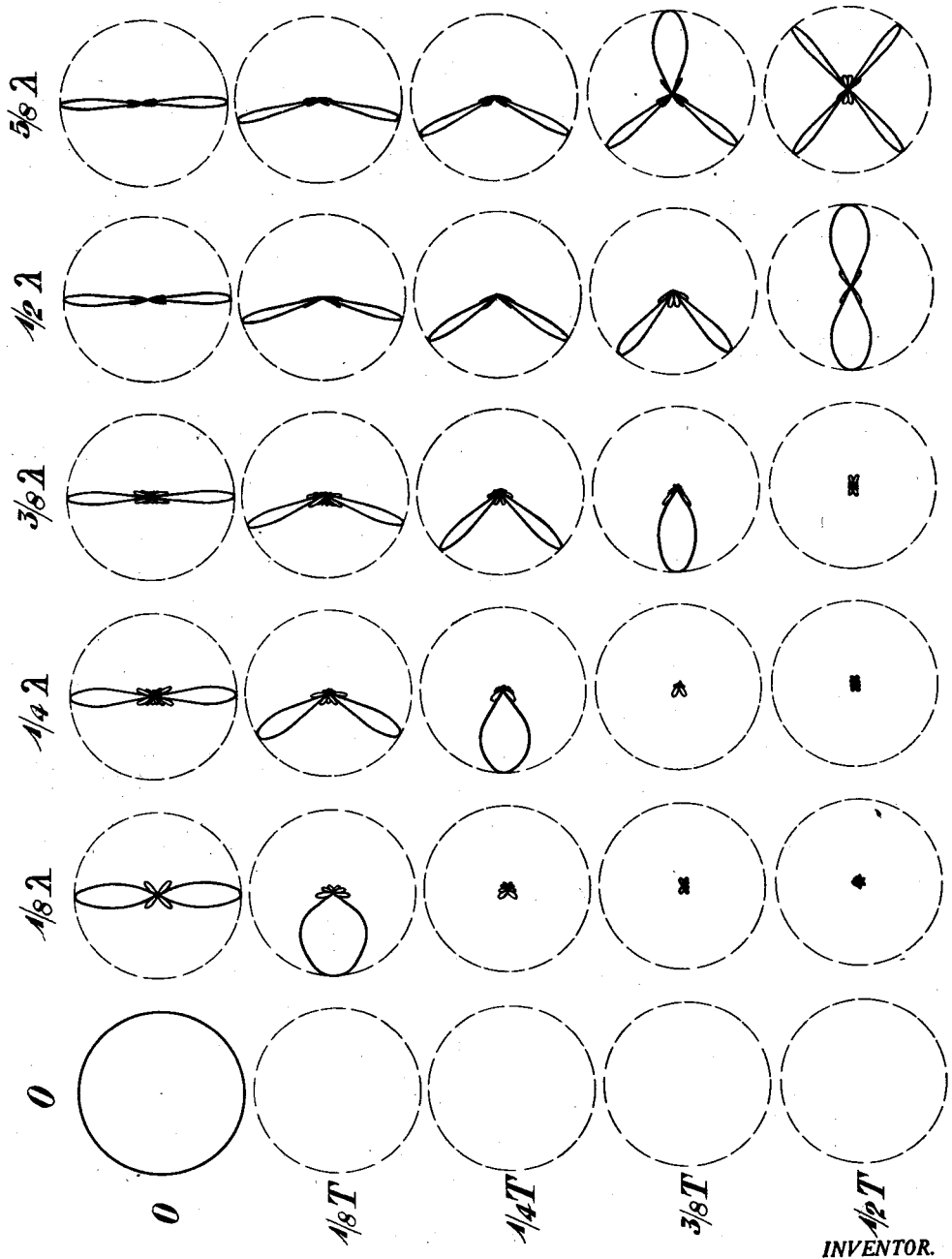

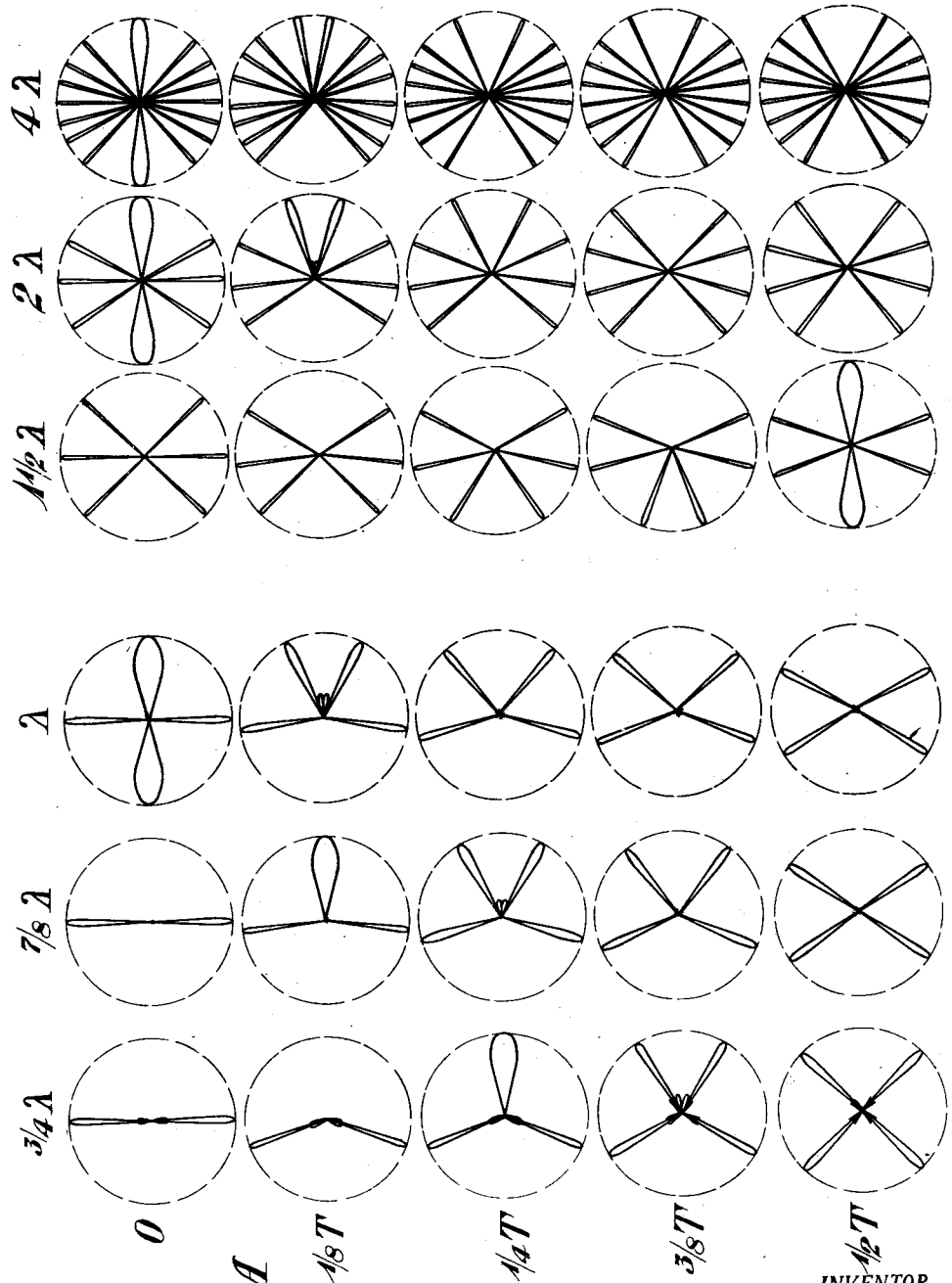
Fig. 3-A

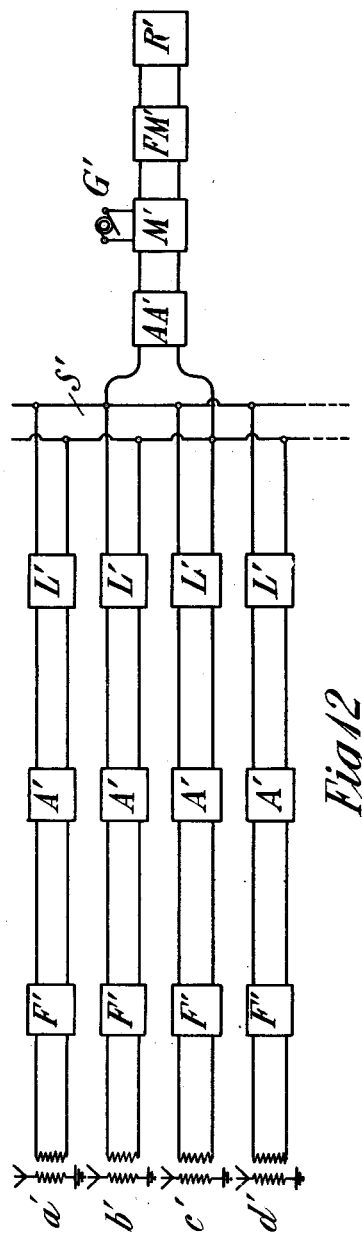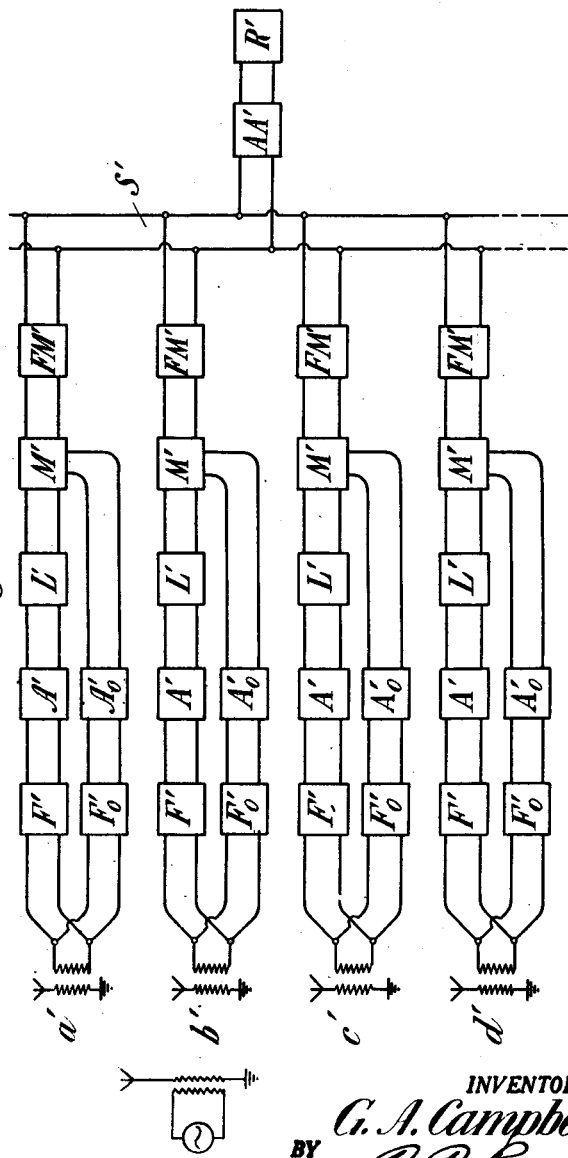
Fig. 12
Fig. 13

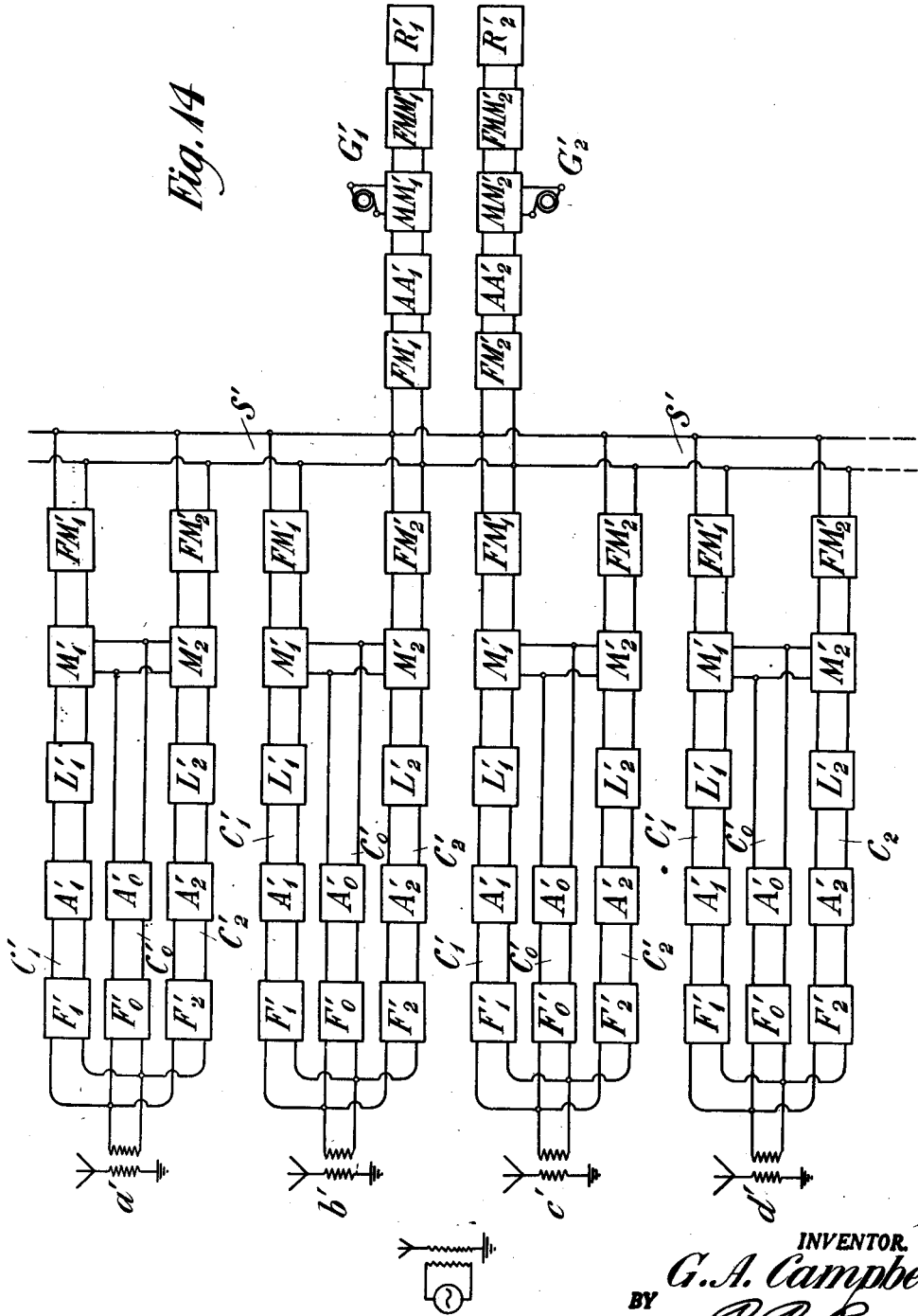

Dec. 10, 1929.   G. A. CAMPBELL   1,738,522
ELECTROMAGNETIC WAVE SIGNALING SYSTEM
Filed Sept. 30, 1919   8 Sheets-Sheet 8
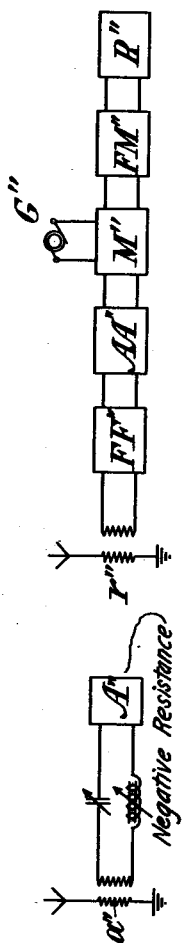
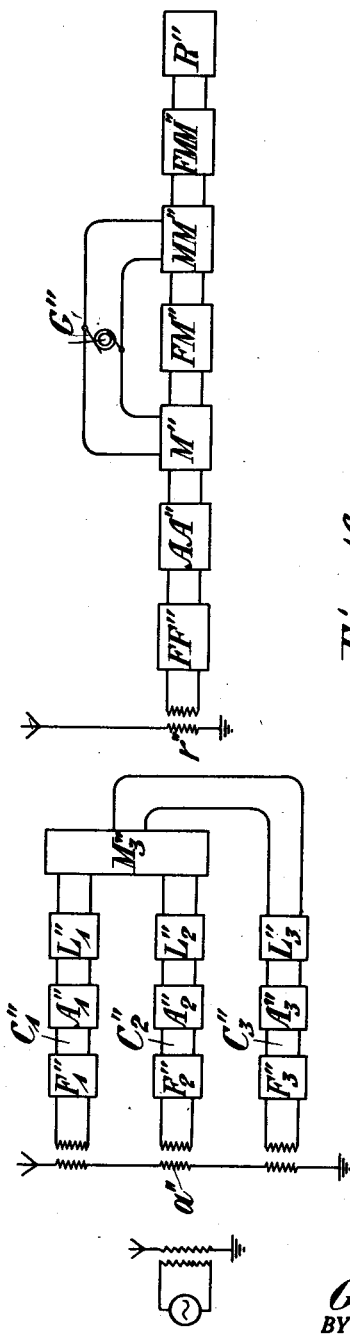
INVENTOR.
G. A. Campbell
BY
ATTORNEYS.

Patented Dec. 10, 1929

1,738,522

UNITED STATES PATENT OFFICE

GEORGE A. CAMPBELL, OF MONTCLAIR, NEW JERSEY, ASSIGNOR TO AMERICAN TELEPHONE AND TELEGRAPH COMPANY, A CORPORATION OF NEW YORK

ELECTROMAGNETIC WAVE SIGNALING SYSTEM

Application filed September 30, 1919. Serial No. 327,553.

My invention relates to the art of signaling by means of electro-magnetic waves.

It is an object of the invention to secure flow of energy from a transmitting station principally in certain definite directions, to provide means whereby the direction of transmission may be varied at will, and to permit of the simultaneous transmission of a purality of messages in the same, or in different directions, as may be desired.

The invention provides also for a receiving system in which there is a substantial reduction of interference due to strays or static, which is selectively responsive to incoming signal waves according to their direction, and which is capable of the simultaneous reception of a plurality of messages from the same or different directions.

I provide transmitting and receiving stations comprised of a number of antennæ arranged in space in accordance with the desired direction or directions of transmission or reception, and provide circuit arrangements or other means for associating the individual antennæ with a common transmitting or receiving device and for governing the flow of energy between the antennæ and the transmitting or receiving device, all as described in detail hereinafter.

Figure 10:
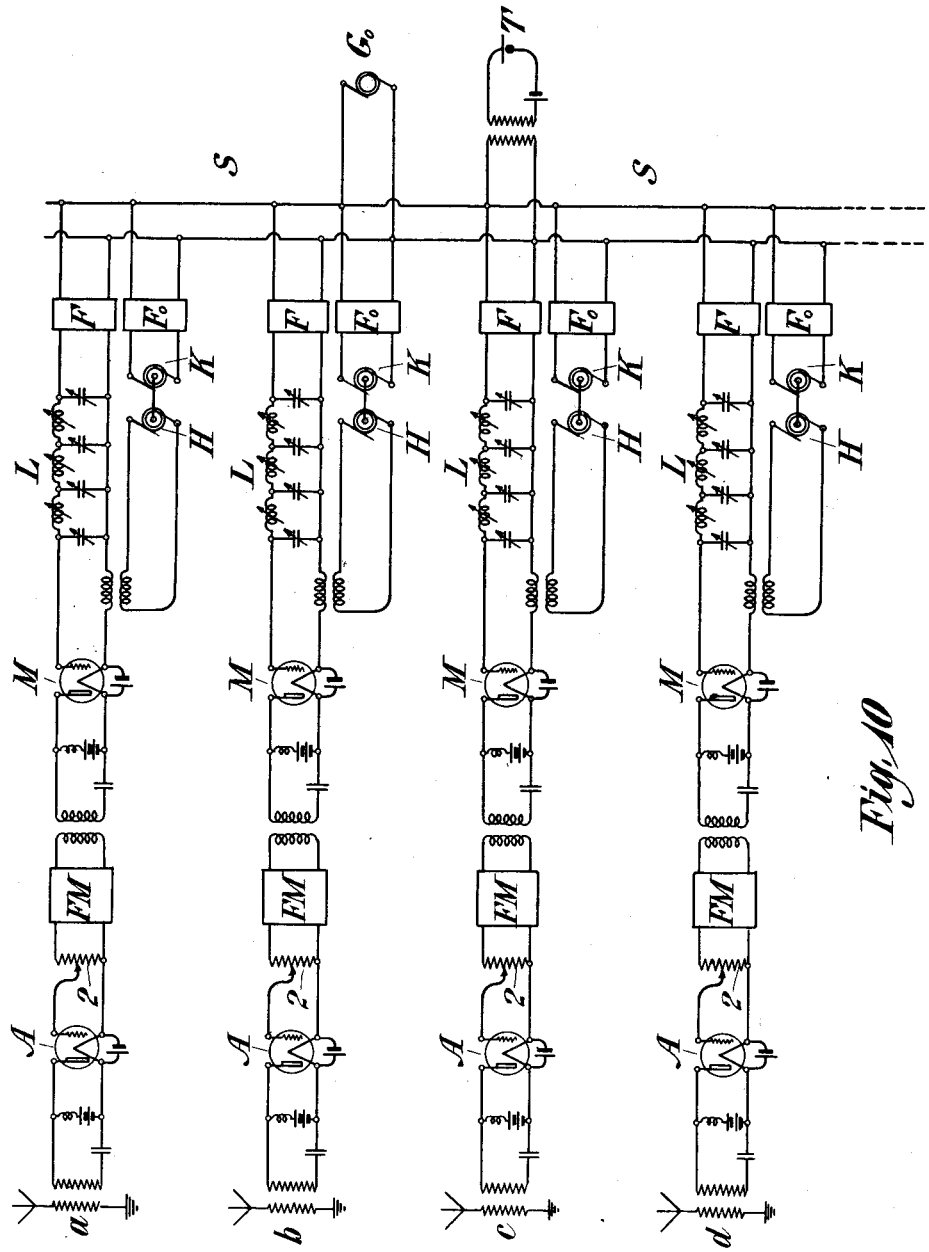
Figure 11:
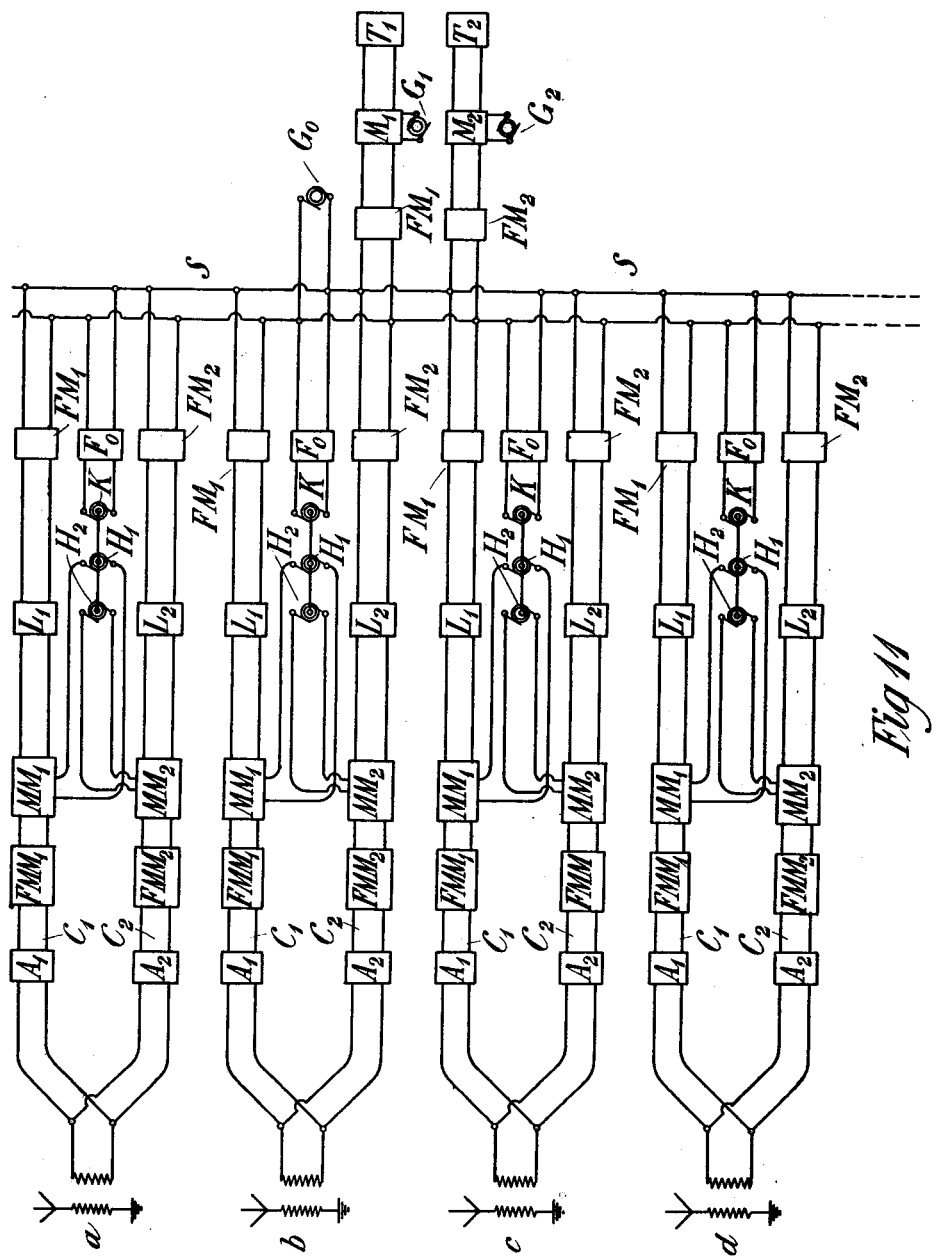

My invention is illustrated in the accompanying drawings in which Figure 1 is a diagram showing in elementary view the broad form of my invention, fundamental to all specific embodiments thereof; Figs. 2, 4, 6, and 8 are diagrammatic views illustrating certain specific embodiments of the invention; Figs. 3 and 3A are diagrams showing the directive properties of the embodiment of my invention illustrated in Fig. 2; Figs. 5 and 5A, 7 and 9 are diagrams similar to those of Figs. 3 and 3A and relating to the specific embodiments of my invention illustrated in Figs. 4, 6 and 8, respectively; Fig. 10 is a diagrammatic view of one form of circuits of my invention for associating a transmitting device with the antennæ; Fig. 11 is a view showing a system similar to that of Fig. 10 but modified to permit of the simultaneous transmission of a plurality of messages; Fig. 12 is a diagrammatic view showing one form of circuits of my invention for associating a receiving device with the antennæ; Fig. 13 is a diagrammatic view of a modification of the circuits shown in Fig. 12; Fig. 14 is a diagrammatic view showing a receiving system similar to that of Fig. 13 but modified to permit of the simultaneous reception of a plurality of messages; Fig. 15 is a diagrammatic view of still another form of receiving system of my invention; and Fig. 16 is a diagrammatic view showing a modification of Fig. 15.

Similar characters of reference refer to similar parts in each of the several views.

When oscillations of the same frequency are impressed on a number of antennæ located at any points in space, the waves from the several antennæ combine to produce a certain resultant wave, the energy of which is not, in general, uniform in all directions. The distribution of the energy radiated by a system of $n$ antennæ, Fig. 1, situated at $n$ points $Z_1$, $Z_2$—$Z_n$ within a limited region of space R, may readily be visualized by constructing a surface, termed herein a characteristic surface, any radius vector of which is proportional in length to the amplitude of the field of the antennæ at a chosen distance $r$ measured in the direction of the vector from an arbitary point of reference, $P_o$ within R. The form of this surface is essentially the same for all such values of $r$, as are large in comparison with $(a)$ the dimensions of R and $(b)$ the wave length of the radiation; for, although the amplitude of the field decreases with the length of $r$, the ratios of the amplitudes in different directions remain essentially unchanged. Under these restrictions a single surface may therefore be constructed to show the energy distribution of any given system of antennæ. In determining the form of this surface I shall assume that the dimensions of the antennæ are small compared to the distances between them, that the radiation from each antenna is equal in all directions, as is the case when the antennæ are spherical in shape, and that the value of $r$ for which the surface is being calculated is so large, that the fields of the several antennæ are essentially parallel at the point P.

With the above restrictions the resultant field at a point P due to any system of antennæ is equal to the vector sum of the fields at P due to the individual antennæ composing the system, each field being represented by a vector of length equal to the amplitude and angle equal to the phase of the field. If $E_i$ and $\phi_i$ designate the amplitude and phase angle, respectively, of the field at P due to any antenna $Z_i$, the resultant amplitude E may be written:

$$E = \sqrt{(\Sigma E_i \cos \phi_i)^2 + (\Sigma E_i \sin \phi_i)^2} \quad (1)$$

or $$E = \sqrt{\sum_{i=1}^{i=n} \sum_{j=1}^{j=n} E_i E_j \cos(\phi_i - \phi_j)} \quad (2)$$

The phase difference $(\phi_i - \phi_j)$ of any two fields at P is dependent upon the difference in the distances between $Z_i$ to P and $Z_j$ to P and also upon the difference in the phases of the currents in antennæ $Z_i$ and $Z_j$. In Fig. 1, let $\Theta$ = angle which $r$ makes with arbitrary zero direction X in any plane, as for instance, the plane of the paper.

$\Theta_{ij}$ = angle which the projection of $Z_i Z_j$ on the plane of the paper makes with the zero direction.

$a_{ij}\lambda$ = distance between projections of $Z_i$ and $Z_j$, $\lambda$ being the wave length.

$b_{ij}T$ = lag of current in $Z_j$ behind that in $Z_i$, T being the length of the period or cycle of the current.

Then $$\phi_i - \phi_j = 2\pi[a_{ij} \cos(\Theta - \Theta_{ij}) + b_{ij}] \quad (3)$$

hence $$E = \sqrt{\sum_{i=1}^{i=n} \sum_{j=1}^{j=n} E_i E_j \cos\{2\pi[a_{ij} \cos(\Theta - \Theta_{ij}) + b_{ij}]\}} \quad (4)$$

By means of this equation it is possible to determine the amplitude at any point of the field of any system of antennæ, and by calculating this amplitude at a sufficient number of points in space equidistant from $P_o$, it is possible to determine the characteristic surface of the system. In most cases, however, it will be more convenient to utilize sections of this surface through the origin, that is, curves or characteristic diagrams showing the distribution of radiation in chosen planes through $P_o$.

In a specific form of antenna system of my invention, I arrange the antennæ in rectilinear array (see Fig. 2), the antennæ being spaced equal distances, $a\lambda$, apart, the amplitude of the currents in the antennæ being equal and the lag of the current in successive antennæ to the right being $bT$, a positive valve of $b$ denoting lag and a negative value, lead. To determine the characteristic diagram for this array in any plane through the axis of the array, let $\Theta$ denote the angle between radius vector of the diagram and the axis of the array. Equation (3) then becomes $\phi_i - \phi_j = 2\pi a \cos \Theta + 2\pi b$, which will be designated by $\delta$. If $E_1$, the amplitude of the oscillation of each antenna, is chosen as unity, Formula (4) becomes $$E = \sqrt{n + 2 \sum_{j=1}^{j=n-1} (n-j) \cos j\delta} \quad (5)$$

or $$E = \sqrt{\frac{\sin^2 n\delta/2}{\sin^2 \delta/2}} \quad (6)$$

hence $$E = \left| \frac{\sin n\delta/2}{\sin \delta/2} \right| \quad (7)$$

It is convenient to divide the valve of E by the sum of the amplitudes of the individual antennæ, thus representing the maximum possible radiation in any direction by a radius vector of unit length. If, then, $\rho$ designates the length of the radius vector of the characteristic, $$\rho = \frac{E}{n} = \frac{\sin n\delta/2}{n \sin \delta/2} \quad (8)$$

Substituting for $\delta$ its value, $$\rho = \left| \frac{\sin(n\pi a \cos \Theta + n\pi b)}{n \sin(\pi a \cos \Theta + \pi b)} \right| \quad (9)$$

By means of Equation (9) I may derive the characteristic diagram in any plane through the axis thereof for a rectilinear array having any desired values of $n$, $a$ and $b$. As an example of the distribution of the field of a rectilinear array in any plane through the axis thereof, I have shown in Figs. 3 and 3A certain characteristic curves for an array of 16 antennæ, the axis of the arrays being placed parallel to the long side of the sheet in the diagrams. For any of these diagrams the distance between successive antennæ is marked in terms of wave length at the head of the vertical column and the phase difference between the currents in the successive antennæ is noted at the left of the horizontal row. No diagrams have been shown for values of $bT$ greater than a half cycle because the characteristics repeat, and when $b$ is negative the diagrams are similar, except that the left and right sides are reversed. The dotted circles in the diagrams show the maximum total radiation of the array, i. e. the case in which both $a\lambda$ and $bT$ are zero.

It will be observed from these diagrams that sharp directivity, indicated by narrow loops, is attained by wide spacing of the antennæ and that the number of directions of maximum radiation, i. e. the number of loops, increases with the spacing. It will be noted also that the directions of maximum radiation are dependent upon the phase relations of the antenna currents. For instance, with the antennæ spaced at half wave length intervals, the direction of maximum radiation is at right angles to the axis of the array in case the oscillations are in phase, but in the direction of the axis if the oscillations in successive antennæ are a half period out of phase, and in intermediate directions if the oscillations in the successive antennæ differ by a smaller fraction of a period. The diagrams indicate, further, that to secure maximum radiation in any direction whatsoever, the phase difference in periods must not be greater than the separation in wave lengths, and that in general when these quantities are equal (e. g. $1/4\lambda$, $1/4T$) the loop is unilateral, which indicates that the array radiates in a single direction only.

Since each of the above diagrams applies to any plane through the axis of the antennæ, it follows that the characteristic surface corresponding to any diagram may be determined by revolving the diagram about the horizontal axis thereof. Although the above computations are based on the assumption that the individual antennæ radiate uniformly in all directions, it is readily understood that the diagrams for arrays of similarly oriented antennæ, whose radiation is not uniform in all directions, may be derived from the above characteristics by merely multiplying by a reduction factor determined by the polar radiation characteristic of the type of individual antenna employed.

Another form of antenna system embodying my invention is shown in Fig. 4. This system comprises $nn'$ similar antennæ arranged in a plane rectangular array of $n'$ rows and $n$ columns, each row consisting of $n$ antennæ spaced at equal distances, $a\lambda$, with currents in successive antennæ of equal amplitude but lagging in phase by the angle $bT$; each column consisting of $n'$ similar antennæ spaced at equal distances, $a'\lambda$, with currents in successive antennæ of equal amplitude but lagging in phase by the constant angle $b'T$. The amplitude of the field due to each row of this array is given by Equation (7) above. Applying this formula again to combine the $n'$ results due to the $n'$ rows, gives $$E = \left| \frac{\sin n\delta/2}{\sin \delta/2} \right| \cdot \left| \frac{\sin n'\delta'/2}{\sin \delta'/2} \right| \quad (10)$$

where
$$\delta = 2\pi a \cos \theta + 2\pi b$$
and
$$\delta' = 2\pi a' \sin \theta \cos \psi + 2\pi b'$$

the angle $\psi$ being the angle which the plane for which the characteristic is being determined makes with the plane of the array, the said plane of the characteristic being assumed parallel to the rows of the array.

Substituting the above values of $\delta$ in (10), and dividing by $n \cdot n'$, the number of antennæ, to obtain the value of the radius vector, $$\rho = \left| \frac{\sin (n\pi a \cos \theta + n\pi b)}{n \sin (\pi a \cos \theta + \pi b)} \right| \cdot \left| \frac{\sin (n'\pi a' \sin \theta \cos \psi + n'\pi b')}{n' \sin (\pi a' \sin \theta \cos \psi + \pi b')} \right| \quad (11)$$

In Fig. 5 I have illustrated certain curves which serve to show the radiation of an array for which $n=n'=4$ and $a=a'=1/2$, the solid curve showing the radiation in the plane of the array when $b=o$ and $b'=1/2$ and the dotted curve, when the values of $b$ and $b'$ are interchanged. It will be observed that the above change in the values of $b$ and $b'$ causes the direction of radiation to swing through $90°$. For intermediate values of $b$ and $b'$ the maximum radiation is in intermediate directions.

The above Equation (11) is particularly adapted for determining the characteristics in the plane of the array. For vertical planes the following form of the equation is more suitable:

$$\rho = \left| \frac{\sin n\delta/2}{n \sin \delta/2} \right| \cdot \left| \frac{\sin n'\delta'/2}{n' \sin \delta'/2} \right| \quad (12)$$

where $\delta = 2\pi a \cos \beta \cos \alpha + 2\pi b$ and $\delta' = 2\pi a' \cos \beta \sin \alpha + 2\pi b'$, $\alpha$ being the angle which the plane makes with the direction X and $\beta$, the angle which the direction of radius vector makes with the plane of the array.

Fig. 5A illustrates the radiation in vertical planes of the same array as Fig. 5, the solid curve showing the radiation in a plane parallel to direction X, i. e. $\alpha=O$, when both $b$ and $b'$ are zero, and the dotted curve showing the radiation in plane at 45° to the direction X i. e. $\alpha=45°$, when both $b$ and $b'$ are equal to $-1/4$. The curves of Figs. 5 and 5A serve to illustrate that the radiation of a rectangular array may be caused to assume any desired direction or directions by proper variation of $b$ and $b'$. The characteristic surface for any particular values of $b$ and $b'$ is not like a plate or disk, as is generally the case for a rectilinear array, but somewhat of the nature of a beam projecting from the array in the direction of maximum transmission, which beam may be sent in any direction in space by proper choice of constants.

In still another form of array of my invention the antennæ are arranged in radial rows, as indicated in Fig. (6), there being $p$ rows of $n$ antennæ, spaced at equal angles around a central point. The mathematical expression for the characteristic surface of an array of this type, derived similarly as described above, is as follows:

$$\rho = \left| \frac{1}{pn} \sum_{j=0}^{j=p-1} \frac{\sin [n\pi a \cos (\Theta + j\pi/P) \cos \psi + n\pi b_j]}{\sin [\pi a \cos (\Theta + j\pi/P) \cos \psi + \pi b_j]} \right| \quad (13)$$

where $\psi$ is the angle which the radius vector, for which the amplitude is being calculated, makes with the plane of the array, and $\Theta$ is the angle between the projection of the radius vector on the plane of the array and the X direction. Figure (7) shows the characteristic curves of a radial array of two rows of 16 antennæ, in the case when $a=1/2$, $b=0$, the currents in the antennæ being assumed to have equal amplitude. The dotted curve shows the radiation of the array in a vertical plane through one of the rows of the array, and the solid curve shows the radiation in a vertical plane making an angle of 45° with one of the rows of the array. It will be noted that the maximum radiation in the above case is in a direction vertical to the plane of the array, but this direction may be varied at will by employing different values of $b$.

In a fourth form of array of my invention, the antennæ are in the form of $n$ concentric rings, the diameter of the $j^{th}$ ring being $a_j\lambda$. If the amplitudes and phases of the currents in the various antennæ are assumed equal, the mathematical expression for $\rho$ is:

$$\rho = \left| \frac{1}{n} \sum_{j=1}^{j=n} J_o(\pi a j \cos \psi) \right| \quad (14)$$

wherein $\psi$ is the angle which the radius vector makes with the plane of the antennæ and $J_o$ is the Bessel function of order zero.

The distribution of the field of arrays of the last-mentioned type is indicated in Fig. 9, curves having been drawn for cases in which the array is comprised of 1, 2, 4 and 8 rings. The characteristic surface corresponding to any curve may be determined by revolving the same about its vertical axis.

Having thus described various forms of antenna systems of my invention, and shown how the radiation therefrom is governed by the phase and amplitude relations of the antenna currents, I shall now describe certain circuit arragements, also of my invention, for securing any desired phase and amplitude relations in any system of antennæ. In Fig. 10 reference letters $a$, $b$, $c$ and $d$ designate antennæ of a system such as described hereinbefore, which antennæ are connected to a transmitter T (which for example, may be a telephone transmitter) by means of a transmission line S, there being interposed between the line and each antenna an adjustable artificial line or phase shifting device L, as modulator M, and a variable amplifier A. The voice current from the transmitter T flows over the line S through the artificial line L at each antenna into the modulator. Associated with this modulator is a source H of a frequency of, say, 51000 cycles. The voice current, which varies in frequency through a certain broad band or range in the neighborhood of 1000 cycles, is thus combined with the current of 51000 cycles, so that a modulated current, whose frequency is the difference of the frequencies of the two currents, i. e. of the order of 50000 cycles, appears in the output circuit of the modulator. This current passes into a power-supplying amplifier A through a filter FM, this filter, shown symbolically for sake of simplicity, being preferably of the type illustrated in my U. S. Patents Nos. 1,277,113 and 1,227,114, dated May 22, 1917, and so designed as to permit the passage of a broad band of frequencies of the order of 50000 cycles, but to prevent the flow therethrough of such frequencies as lie outside this band or range. The amplifying device A is composed of a battery of electron tubes or other amplifiers, although only one tube is shown in the drawing for sake of simplicity. High frequency oscillations are thus set up in each antenna, the amplitude of which may be adjusted by means of a potentiometer 2 comprised in the input circuit of the amplifier.

The radio frequency generators H are operated by means of synchronous motors K connected to line S, current for these motors being furnished by generator $G_o$ which may be placed at the transmitting station. The frequency of this generator is preferably outside the range of frequencies necessary for audibility of speech, for example 5000 cycles per second, and current therefrom is prevented from entering the antenna circuits by means of voice-range frequency filters F. The voice currents are prevented by filters $F_o$ from entering the synchronous motors K, these filters being arranged to permit the passage therethrough of only 5000 cycle current.

It will be noted that by means of the above described circuits I am enabled to set up coherent oscillations in any number of antennæ located any desired distances apart, without necessitating the transmission of the radio frequency current over the wire line and thus avoiding the exceedingly high transmission losses which would otherwise be incurred. Since the power for the antenna oscillations is furnished by the amplifiers A, the generators H and motors K may be of comparatively small capacity. Since the amplitude of the oscillations may be adjusted independently for each antenna by means of the potentiometers 2, and the phase thereof, by means of the adjustable impedances in the artificial lines L, I am enabled to signal in any desired direction or directions, according to the antenna system employed.

In Fig. 11, I have shown a similar circuit arrangement, modified however, to permit of the simultaneous transmission of more than one message. In this arrangement I provide for double modulation of the voice current, first, at the transmitting station, where the voice current is caused to modulate a current of carrier frequency which is then transmitted over the line to the various antennæ, second, at each antenna, where the modulated carrier current is caused to modulate a source of radio frequency. The first stage modulators are designated by reference characters M, and those of the second stage by characters MM, these devices and also the transmitters, artificial lines and amplifiers being similar to those illustrated in Fig. 10 and herein shown conventionally to avoid unnecessary complexity of the drawing. The simultaneous transmission of two radio waves, different in frequency, is provided for by the arrangement of Fig. 11, one of which waves is governed by a transmitter $T_1$, and the other, by a transmitter $T_2$. The carrier currents are supplied by generators $G_1$ and $G_2$ at the transmitting station, the frequency of these currents being for example 11000 and 16000 cycles respectively. The voice currents, being of a frequency range of the order of 1000 cycles, cause modulated frequency-difference currents of the order of 10000 and 15000 cycles to appear in the output circuits of the respective modulators $M_1$ and $M_2$. These currents are permitted by filters $FM_1$ and $FM_2$ to enter line S, from which line they flow to each antenna through a pair of parallel frequency selective channels $C_1$ and $C_2$, comprising filters $FM_1$ and $FM_2$, similar to the above, artificial lines $L_1$ and $L_2$ and the second stage modulating devices $MM_1$ and $MM_2$. These devices re-modulate the 10000 and 15000 cycle carrier currents by means of currents from sources $H_1$ and $H_2$ of, say 60000 and 75000 cycles respectively. Filters $FMM_1$ and $FMM_2$ in the output circuits of the corresponding modulators permit the resultant 50000 and 60000 cycle bands to enter the power-supplying amplifiers $A_1$ and $A_2$, by means of which they are impressed on the antennæ. The generators $H_1$ and $H_2$ at the various antennæ are maintained coherent in frequency by means of synchronous motors K supplied by line S with current from a generator $G_0$, similarly as in the arrangement of Fig. 10. The amplitudes and phases of the 50000 cycle antenna oscillations are governed separately for each antenna by the adjustments of the amplifiers $A_1$ and lines $L_1$, and those of the 60000 cycle oscillations, by the adjustments of the amplifiers $A_2$ and lines $L_2$. The oscillations of one frequency are thus kept entirely independent in amplitude and phase of the oscillations of the other frequency. In this manner I am enabled to transmit simultaneously waves of one frequency in one direction and waves of another frequency in another, or the same direction, as may be desired. Any number of waves of different frequencies may thus be directively radiated from the same antennæ. It will be observed that with a given antenna system a certain group of antennæ may be chosen for the radiation of one frequency, another group for another frequency, and so on, for as many frequencies as may be desired, the antennæ being so spaced that each antenna enters as many groups as possible so that effective directive radiation may be attained in every desired direction, with the least total number of antennæ.

The directive properties of a system of antennæ are the same, whether the system is used for the radiation of the waves, or the absorption thereof. When the antennæ are associated with a receiving device, the reception is dependent upon the direction of the waves impinging on the antennæ, and by controlling the amplitude and phase of the current transmitted from each antenna to the receiving device, I may control the direction of maximum reception similarly as the direction of transmission may be controlled in the above described transmitting systems. The hereinbefore described characteristic diagrams showing the directive radiation of certain antenna systems illustrate equally well the reception thereof, provided like phase and amplitude relations obtain.

In Fig. 12, I have shown one arrangement of circuits for governing the phases and amplitudes of the currents which flow from the several antennæ to the receiving device. The antennæ $a'$, $b'$, $c'$ and $d'$ of this figure are connected to a transmission line $S'$ by means of channels comprised of filters $F'$, amplifiers $A'$ and artificial lines or phase shifting devices $L'$. The currents induced in the antennæ by the waves impinging thereon, enter the filters $F'$ which permit only waves of a certain predesignated band of frequencies, for example those of the order of 50000 cycles, to enter the amplifiers $A'$. The output currents of these amplifiers pass through the artificial lines $L'$ into the transmission line S wherein the currents from the several antennæ combine and flow to the receiving station. Here they are reamplified by the device $AA'$ and caused to enter the modulator M', which comprises a source of modulating current G', the frequency of which is, say, 51000 cycles. Current of the 1000 cycle or audible range is thus caused to appear in the output circuit of the modulator and this current is passed by the band filter FM' into the receiving device R', which may be a telephone receiver. The loudness of the response of the receiver depends, of course, on the amplitudes of the currents from the individual antennæ and the phase relations they bear to each other as they enter the receiving station. The amplitudes of these currents may be adjusted by variable amplifiers A' and their phase relations by the lines L'. Directive reception may therefore be realized, according to the type of antenna system employed, as hereinbefore explained.

It will be observed that the arrangement of Fig. 12 necessitates the transmission from the several antennæ to the receiving station of currents of radio frequency. This is avoided in another arrangement, also of my invention, illustrated in Fig. 13. In this modification I employ a modulating device at each antenna and transmit only the low frequency voice currents over the transmission line to the receiving station. The 50000 cycle current from each antenna flows, as before through filter F' into amplifier A', and the output current of this device flows through a line L' into the modulator M', which is supplied in the manner described below with current of 51000 cycle frequency. The resultant frequency-difference current of audible range is passed by filter FM' into line S' wherein it combines with the currents from the other antennæ and flows to the receiving station. Here it is reamplified by device AA' and caused to enter the receiver R'. The 51000 cycle current is supplied to the several modulators by radiation, preferably from an auxiliary antenna located in the vicinity of the receiving antenna system, although this frequency may also be sent out by the transmitting station. The 51000 cycle current passes through a sharp cut-off filter $F_o'$ into an amplifier $A_o'$, the output current of which is impressed on the modulator M'. The direction of maximum reception may be governed in this system, similarly as in that of Fig. 12, by adjustments of the amplifiers A' and lines L'.

Fig. 14 shows an arrangement similar to that of Fig. 13, but so modified as to permit of the simultaneous directive reception of waves of different frequencies. The incoming waves are modulated at each antenna with frequencies convenient for carrier transmission, combined in the line with the corresponding waves from the other antennæ and the combined waves are modulated at the receiving station into currents of audible frequencies. In case the radio waves are of the order of 51000 and 61000 cycles respectively, they are modulated at the antenna by current of say, 25000 cycles, the currents of the first mentioned frequencies entering the modulators $M'_1$ and $M'_2$ by means of the frequency selective channels $C_1'$ and $C_2'$ respectively, and the current of the 25000 cycle frequency entering the modulators by the sharply tuned channels $C_o'$, the last mentioned frequency being radiated preferably from an auxiliary antenna. The frequency-difference currents of the order of 26000 and 36000 cycles, which are thus caused to appear in the output circuits of the modulators, are passed by the band filters $FM_1'$, and $FM_2'$ into line S', wherein they combine with the corresponding currents from the other antennæ and flow to the receiving station. Here the two bands are passed into separate channels by means of the filters $FM_1'$ and $FM_2'$, amplified by $AA_1'$ and $AA_2'$ and caused to enter the second stage modulators $MM_1'$ and $MM_2'$, provided with sources of currents $G_1'$ and $G_2'$, the frequencies of which are 25000 and 35000 cycles respectively. Frequency-difference currents of audible range are thus caused to appear in the output circuits of the modulators, from which circuits they pass through filters $FMM_1'$ and $FMM_2'$ into receivers $R_1$ and $R_2$ respectively. The direction of reception is governed separately for each frequency by the amplifiers and artificial lines at the several antennæ, hence any number of waves of different frequencies may thus be directively received by the same antenna system.

Instead of using electric currents for transmitting the energy from the several antennæ to the receiving station I may employ electro-magnetic waves, the receiving antennæ being arranged to re-radiate the energy induced therein to an antenna adjacent to the receiving device. One such arrangement is shown in Fig. 15 in which $a''$ designates one of the receiving antennæ of the system, the others of which are not shown. Each receiving antenna is provided with a negative resistance device A'' coupled to the antenna by means of a circuit tuned to oscillations of the order of 50000 cycles, so that oscillations of this frequency are reinforced and re-radiated by the antenna with sufficient energy to cause oscillations in an antenna $r''$. Associated with this antenna is a receiving device R'', a filter FF'', amplifier AA'' and modulator M'' being interposed between the antenna and the receiver to filter and amplify the oscillations of the antenna and modulate the same with current from a source G'' of 51000 cycle frequency, so that frequency-difference current of audible range enters receiver R'', a filter FM'' being employed to extinguish currents of all other frequencies.

The amplitude of the oscillations caused by $a''$ in $r''$ may be governed by adjusting the variable negative resistance $A''$ and the phase of these oscillations is determined by the distance between $a''$ and $r''$. The loudness of the response of receiver $R''$, of course is dependent upon the phase and amplitude relations of the oscillations caused in $r''$ by each of the receiving antennæ. The system has, therefore, directive properties similar to those of the arrangements previously described.

In a modification of the above described arrangement, I modulate the oscillations in the receiving antennæ by a local source of more powerful oscillations, and cause the resultant oscillations to be re-radiated to the antenna with which the receiving device is associated. This modification is illustrated in Fig. 16, in which $a''$ designates one of the receiving antennæ of the system, the others of which have not been shown. Adjacent this antenna is a modulator $M_3''$, the input side of which is associated with the antenna by two frequency selective channels $C_1''$ and $C_2''$ and the output side, by a channel $C_3''$. The first of these channels passes oscillations of the frequency of the signal wave, which may be of the order of 51000 cycles, to the modulator, and the second channel passes thereto oscillations of a frequency of, say, 150000 cycles induced in the antenna by an auxiliary sending antenna (not shown) placed in the vicinity of the receiving antenna system. Channels $C_1''$ and $C_2''$ comprise filters $F_1''$ and $F_2''$, amplifiers $A_1''$ and $A_2''$ and phase shifting devices $L_1''$ and $L_2''$, by means of which the oscillations are amplified and changed in phase to any desired extent, before being impressed on the modulator. The frequency-difference current of the order of 101000 cycles, which is thus caused to enter the output side of the modulator, flows through channel $C_3''$ into antenna $a''$; artificial lines $L_3''$ and amplifiers $A_3''$ being provided to govern the phase and amplitude of this current and a filter $F_3''$ being employed to prevent current of other frequencies from entering the antenna. The oscillations which are thus set up in the receiving antennæ are radiated to the antenna $r''$ with which the receiver $R''$ is associated, there being two modulators interposed between the antenna and the receiver, the first of which $M''$, is supplied by generator $G_1''$ with current of frequency 50000 and passes through filter $FM''$ current of a frequency of 51000 cycles into the second modulator $MM''$. This device is also supplied with current of 50000 cycle frequency and passes current of voice frequencies through filter $FMM''$ into receiver $R''$. The loudness of the response of this receiver depends, of course, on the amplitude and phase relations of the currents induced in antenna $r''$ by the individual receiving antennæ. Since these phases and amplitudes are adjustable independently at each antenna, the direction of maximum reception may be altered at will.

The double modulation of the current between antenna $r''$ and receiver $R''$ is necessary to make the total number of modulations between transmitter and receiver even. When, as herein, the frequency-difference is used in modulation, the frequency scale is inverted at each modulation. Consequently the total number of modulations between transmitter and final receiver must be even. It is of course understood that this invention is not limited to the use of frequency-difference current in modulation, nor to the use of the particular frequencies herein used for illustration.

Because of the directive properties of the above described receiving systems, interference due to strays or static disturbances is considerably lessened, all disturbances not in line with the direction or directions of maximum reception causing little, if any, response of the receiver, and strictly local disturbances, affecting say only one of the antennæ, producing only a fraction of the response which would be caused in case that particular antenna were the only one in use.

Similarly as in the hereinbefore described multiple frequency transmission system, I may divide the antennæ of a receiving system into groups, utilizing the different groups for directive reception of waves of different frequencies or directions, the antennæ being so spaced that each antenna enters as many groups as possible, so that effective directive reception may be attained in every desired direction, with the least total number of antennæ.

Although I have herein shown and described only a few forms of embodiments of my invention, it is readily understood that various changes and modifications may be made therein within the scope of the following claims without departing from the spirit and scope of the invention.

What I claim is:

1. The method of varying the direction of the approximate beam or beams to which the preferred directions of transfer of energy between a multiple high frequency antenna system and the surrounding space are substantially confined, which consists in varying the phase relation of the transfer of energy at lower frequency between the individual antennæ and the translating device common thereto.

2. The method of adjusting the directions of preferred effective operation and non-operation between a high frequency multiple antenna system and the surrounding space which consists in adjusting the phase relation of the transfer of energy at lower frequency between the individual antennæ and the translating device common thereto.

3. The method of adjusting the directions of preferred effective operation and non-operation between a multiple antenna system and the surrounding space which consists in operating the antennæ at high frequency and an associated central station at low frequency and heterodyning between the said currents of high and low frequency and adjusting the phase relation of the beats to get reinforcement in the direction of preferred operation and annulment in a direction for which operation is desired to be excluded.

4. The method of receiving electromagnetic wave signals by multiple antennæ, which consists in providing at the antennæ respective coherent sources of high frequency oscillations, causing the said oscillations to modulate the oscillations of the signal waves, and transmitting modulated current of comparatively low frequency to a receiving device.

5. The method of receiving electromagnetic wave signals by multiple antennæ, which consists in providing at the antennæ respective coherent sources of high frequency oscillations, causing the said oscillations to modulate the oscillations of the signal waves, transmitting modulated currents of comparatively low frequency to a receiving device, and adjusting the phase relations of said low frequency currents to secure maximum reception in a desired direction and minimum reception in a direction from which it is desired to exclude reception.

6. In combination, a plurality of antennæ arranged in rectangular array, a translating device associated with said antennæ, a local cource of current of low frequency compared to the currents in the antennæ, respective modulators connected with the circuits of said currents and in which beats are produced, and means to adjust the phase relation of the beats to cause said array to have directivity in any designated direction.

7. In combination, a plurality of antennæ, a plurality of translating devices, a transmission line and frequency selective channels for associating the antennæ with said translating devices, and means associated with said channels for governing the phases and amplitudes of the currents therein.

8. In combination, a plurality of high frequency antennæ, a plurality of translating devices, a low frequency transmission line and frequency selective channels for associating the antennæ with said translating devices, a source of intermediate frequency current, modulators connected with said source and connected respectively with the circuits of said high and low frequency, and means to adjust the phases and amplitudes of the beat currents from said modulation to attain directional operation of the antenna system.

9. In combination, a plurality of antennæ, means for inducing oscillations therein differing in frequency, a device at each antenna for modulating one of said oscillations by the other, and a receiving device responsive to the modulated oscillations from the antennæ.

10. In combination, a plurality of antennæ, means for inducing oscillations therein of different frequency range, one range corresponding to a message channel and the other range being a definite frequency of a locally generated current, means at each antenna for modulating one of said oscillations by the other, and a receiving device responsive to the modulated oscillations from the antennæ.

11. In combination, a plurality of receiving antennæ adapted to receive currents of the same frequency range, a local source of currents of frequency outside the range to be received, means to apply said last mentioned currents to modulate the currents received by said antennæ, and a receiver in which the modulated currents are combined to give directional selectivity.

12. In combination, a plurality of receiving antennæ, a local source of currents of frequency outside the frequency range to be received, respective means to modulate the antenna currents with current from said local source, a receiver in which the modulated currents are combined, and means to adjust the phase relation of the modulated currents to get maximum effect in a desired direction and minimum effect in another desired direction.

13. The method of discriminating according to direction between received currents in two antennæ, which consists of producing beats between each of these currents and a third current of different frequency and adjusting the phase difference between the two trains of beats by balancing so as to get the beats to reinforce one another for the desired direction of reception and to counteract one another for a direction from which it is desired not to receive.

14. The method of directionally selective reception which includes receiving wave trains on spaced collectors, heterodyning independently the wave trains received and balancing to bring the resulting beat currents into phase relation for cumulative effect from the direction of desired reception and for counteracting effect from a direction from which reception is desired to be excluded.

15. The method of directionally selective reception which consists of receiving wave trains on two spaced collectors, heterodyning independently the two received wave trains with a single common source of oscillations and balancing to bring the currents into phase relation for cumulative effect from the direction of desired reception and for counteracting effect from a direction from which reception is desired to be excluded.

16. A system of directionally selective reception which includes a plurality of spaced collectors, receiving circuits associated therewith, means for heterodyning the received currents, and balancing means for bringing the beat currents into phase relation for cumulative effect from the direction of desired reception and for counteracting effect from a direction from which reception is desired to be excluded.

17. A system of directionally selective reception which includes two spaced collectors, receiving circuits associated therewith, heterodyning means common to the two circuits, and balancing means for bringing the circuits into phase relation for cumulative effect from the direction of desired reception and for annulling effect from a direction from which reception is desired to be excluded.

18. In combination, a plurality of antennæ adapted to have high frequency currents developed therein, a central station, means to transmit modulated currents of relatively low frequency between said antennæ and said central station, means to supply an auxiliary current of definite frequency at each antenna, and modulators at the respective antennæ by which said auxiliary current is modulated by one of said other currents to produce the remaining mentioned current.

19. The method of radio operation which consists in developing high frequency currents in each of a plurality of antennæ and transmitting low frequency currents between the respective antennæ and a central station, and applying an auxiliary current at each antenna modulated by one of the earlier mentioned currents to produce the remaining current.

20. The method of directional radio reception which comprises producing from a wave propagated in space, a plurality of electromotive forces differing in phase, separately modulating said electromotive forces with auxiliary waves of a common frequency and controlling the phase relations of the products of modulation and combining them to produce a desired resultant effect.

21. In a directive radio receiving system, the method of suppressing the effect of waves propagated in at least one direction in space, which comprises producing from said waves a plurality of electromotive forces differing in phase, separately modulating said electromotive forces with auxiliary waves of a common frequency, selecting and combining components of said modulation processes to produce signals therefrom, and adjusting so that said selected components produce zero resultant effect.

22. In a directive radio receiving system, a plurality of antennæ adapted to produce from space propagated waves electromotive forces differing in phase, an auxiliary wave source, means for separately modulating the electromotive force waves of said antennæ with waves from said auxiliary source, and means for controlling the phases of the modulation products to produce a predetermined relationship among them.

23. In combination, a rectangular array of high frequency receiving antennæ, a local radiator of intermediate frequency, branch circuits and filters associated with respective antennæ to separate received modulated high frequency message currents of different frequency ranges and also to separate out the currents of intermediate frequency determined by said local radiator, means at the respective antennæ to modulate said high frequency currents by said currents of intermediate frequency, a central station, conductors to transmit said modulated currents thereto, branch circuits and filters at said central station to separate said modulated currents corresponding to said high frequency ranges, respective modulators at said central station, and receivers associated therewith.

24. In combination, a plurality of high frequency receiving antennæ, a local radiator of intermediate frequency, means at the respective antennæ to modulate the high frequency currents received on said antennæ by the currents of intermediate frequency due to said local radiator, a central station, conductors to transmit said modulated currents thereto, a modulator at said central station, and a receiver associated therewith.

25. In combination, a multiple antennæ array for directionally selective high frequency receiving, all the antennæ of said array being adapted alike for reception over the same frequency range, a local source of intermediate frequency, means to modulate the high frequency currents received in the said antennæ by the current from said local source and a receiver associated with said means.

26. In combination, a multiple antenna array for high frequency receiving, a local source of current of relatively lower frequency, means to combine the high frequency currents received in the antennæ with the single frequency current from said source to produce beats, means to adjust the phase relation for the beats corresponding to the respective antennæ, and a receiver operatively connected to receive the beat currents.

27. In combination, a plurality of high frequency receiving antennæ, a local source of current of intermediate frequency, a central station, conductors connecting the same with the respective antennæ, means to combine the current received on each antenna with the current from said local source to produce beats, and means to adjust the phase relation of the beats to adjust the directions for preferred reception and for preferred non-reception.

28. The method of directionally selective radio receiving on multiple antennæ, which consists in developing currents of the received frequency in respective circuits associated with the antennæ, generating local alternating currents of a frequency different from the received frequency, and applying to them the said currents of received frequency to modulate them in different phases and amplitudes for the respective antennæ and combining the modulated currents of different phase and amplitude for reception.

29. The method of directional radio receiving on multiple antennæ, which consists in generating a local alternating current, and applying it to modulate the respective currents determined by reception in the antennæ adjusting the relative phase of these modulated currents to get maximum reception in the desired direction and minimum reception in another particular direction, and combining these phase adjusted modulated currents for reception.

30. A method of receiving wireless signals which consists in combining a slightly different heterodyne frequency with the signals so as to produce a beat current, superimposing on the beat current another current of the same frequency, and adjusting the phase of the heterodyne or of the signals to adjust the phase of the beat current to a desired phase relative to the other current.

31. A method of receiving wireless signals which consists in receiving the signals in a plurality of aerials, heterodyning all of the signal currents from the same source to produce a plurality of beat frequency currents of the same frequency, combining the beat frequency currents and adjusting the phase of the heterodyne or the signals to cause said beat frequency currents to combine in a desired manner.

32. A wireless receiving system comprising a plurality of receiving aerials, a heterodyne for producing a frequency adapted to beat with received signals, means for supplying said heterodyne frequency to said aerials in different phase relation and means for combining the beat currents produced.

33. The method of controlling the relative phase of a plurality of currents resulting from the interaction of component currents of different frequencies which consists in controlling the phase relation of one of said component currents to produce the desired phase relation of said resultant currents.

In testimony whereof, I have signed my name to this specification this 29th day of September, 1919.

GEORGE A. CAMPBELL.